Jan. 7, 1975 R. T. BUSTOS Re. 28,293

ADJUSTABLE MERCHANDISE SUPPORT WITH SPACED, MOLDED SHELVES

Original Filed Nov. 12, 1970 2 Sheets-Sheet 1

INVENTOR
RAFAEL T. BUSTOS
BY Robert J. Henry

ADJUSTABLE MERCHANDISE SUPPORT WITH SPACED, MOLDED SHELVES
Original Filed Nov. 12, 1970 2 Sheets-Sheet 2
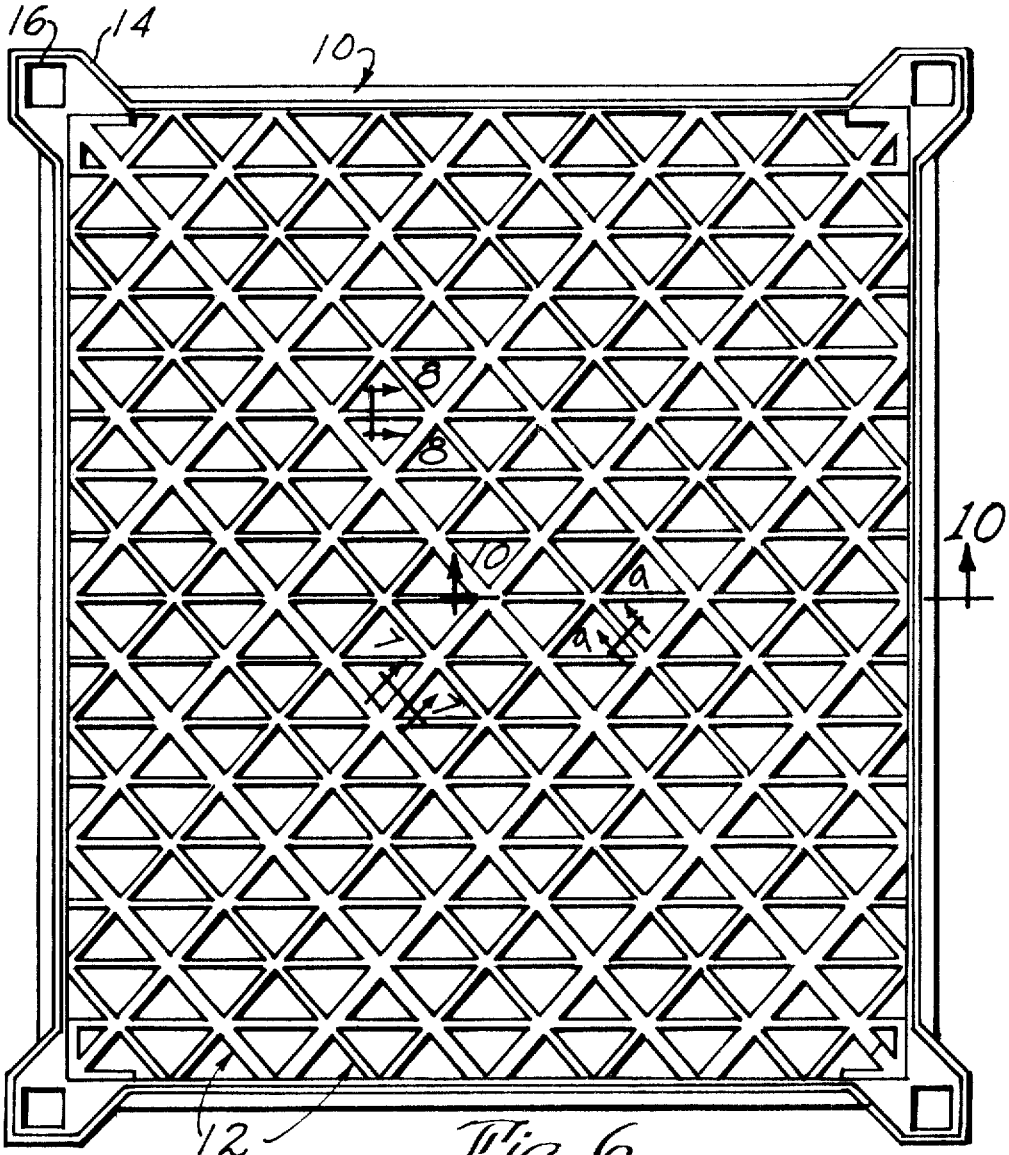
Fig. 6
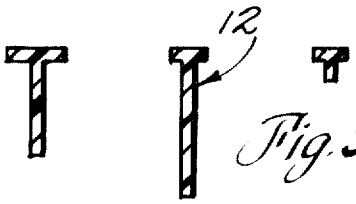
Fig. 9
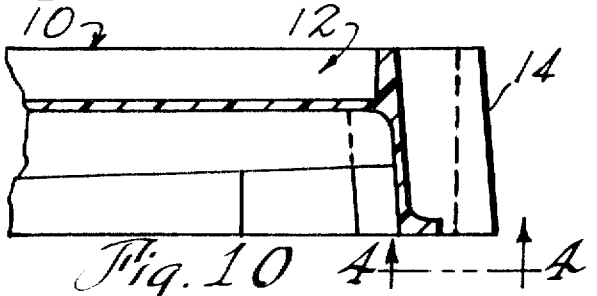
Fig. 10
Fig. 7 Fig. 8
INVENTOR
RAFAEL T. BUSTOS
BY Robert F. Henry
ATTORNEY United States Patent Office Re. 28,293
Reissued Jan. 7, 1975

28,293

ADJUSTABLE MERCHANDISE SUPPORT WITH SPACED, MOLDED SHELVES

Rafael T. Bustos, Atlanta, Ga., assignor to Leggett & Platt, Incorporated, Carthage, Mo.

Original No. 3,664,274, dated May 23, 1972, Ser. No. 88,560, Nov. 12, 1970. Application for reissue Apr. 1, 1974, Ser. No. 456,800
Int. Cl. A47b *13/02*
U.S. Cl. 108—144 14 Claims

Matter enclosed in heavy brackets [ ] appears in the original patent but forms no part of this reissue specification; matter printed in italics indicates the additions made by reissue.

ABSTRACT OF THE DISCLOSURE

A merchandise shelf arrangement utilizing molded plastic shelves each of which has a corner arrangement with an open bore through which is fitted a respective vertical support member resting on the floor. Tapered plastic inserts removably placed between the vertical members and the respective bore of each shelf corner retains the shelf in a selected location ready for easy removal and repositioning. Projecting lugs or tongues on each molded insert are fitted respectively into one of many vertically spaced locations on a vertical member to hold the tapered insert in place. Weight from a number of cartons of bottles or the like pressing downwardly on the shelf causes a tighter relationship between each insert and its respective corner to assure positive retention of each shelf. Each shelf is molded integrally with each corner arrangement in a pattern which may be in the form of an open grid structure reducing weight and is of plastic material and providing ventilation and drainage.

BACKGROUND OF THE INVENTION

1. Field of the Invention

Generally racks and supports and more particularly plural shelves with ground support and means on each shelf for adjusting same relative to the ground supports and other shelves.

2. Description of the Prior Art

The known prior art includes U.S. Pat. Nos. 3,245,365, 3,437,060, 3,376,980 and 3,424,111. These patents show that generally the use of some type of inserts for holding shelves is old in the art including tapered inserts. However, the arrangement of corner support structure on each shelf which may be fabricated into the shelf itself as by molding plus the use of a cooperating wedge-like tapered insert which is selectively and removably positioned in a positive manner as by insertion into vertical members in a number of locations is not taught by the disclosures in these patents. This arrangement makes it possible to use shelves that are fabricated by other than bent or welded wire so as to reduce the weight and to reduce the cost of fabrication and securely position them in place. Since such shelves must be fairly rigid and must have a good substantial retention at each corner to prevent accidents and loss of merchandise it is beneficial in this art to have the present arrangement which can be made in a molded shelf fabrication operation with a positive support means at each corner.

SUMMARY OF THE INVENTION

A plurality of shelves each comprises a shelf structure that may be fabricated as by molding in a single unit with corner structure at each corner comprising a cavity into which is fitted a respective vertical member that is held in place by a small plastic or similar wedge member, thereby eliminating bent or welded wire shelves, which are held in place by inserting the tongue or projections or the like thereon into a respective vertical member. This reduces the cost of fabrication and also cuts down on the weight of the shelves which provides a saving in shipping costs and in cost of manufacture. Furthermore, the reduction in weight reduces the overall weight of the shelf arrangement wherein a plurality of shelves are used with merchandise such as soft drink bottle cartons and the like. Each shelf is a simple fabrication operation with some sort of cavity at each corner such as a through opening in a sleeve-like arrangement which cooperates with a small inexpensive plastic wedge having the projection thereon thereby eliminating more complex fastening devices which must be made from metal. The combination of the shelf structure with the locking wedges positively located on a respective vertical member makes it possible to use a more inexpensive form of fabrication such as plastic molding than previous shelf arrangements which had to be made by bending or forming wire or casting or making metal parts.

BRIEF DESCRIPTION OF THE DRAWINGS

FIG. 6 is a top plan view of the shelf shown in FIG. 1.

FIG. 7 is a cross-sectional view taken along lines 7—7 in FIG. 6.

FIG. 8 is a cross-sectional view taken along lines 8—8 in FIG. 6.

FIG. 9 is a cross-sectional view taken along lines 9—9 in FIG. 6.

FIG. 10 is a cross-sectional view taken along lines 10—10 in FIG. 6.

DESCRIPTION OF A PREFERRED EMBODIMENT

Figure 1:
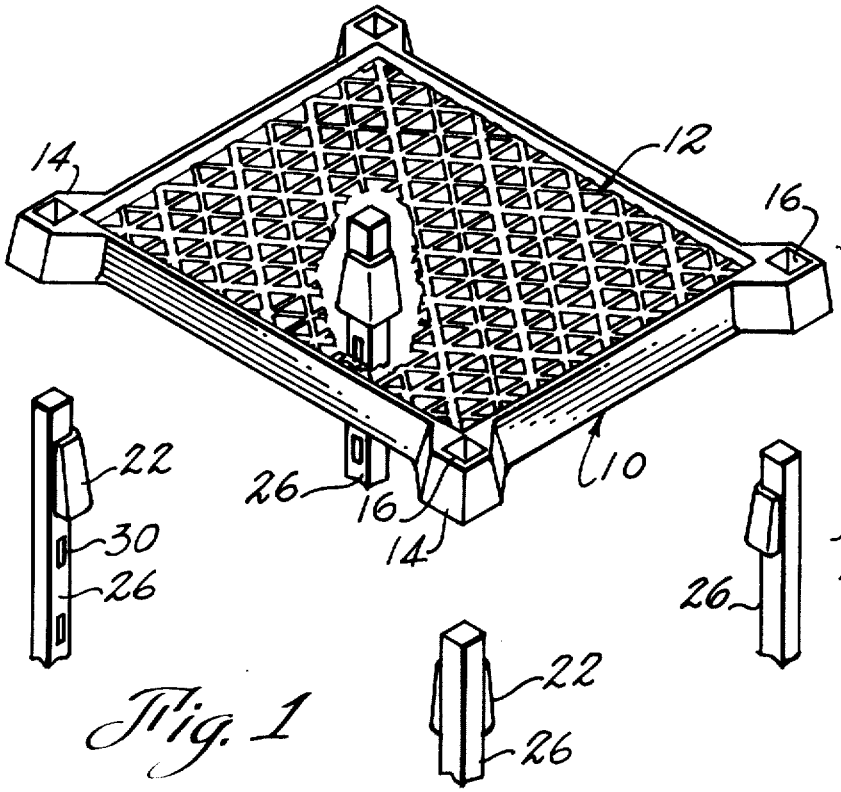
FIG. 1 is a perspective view of one shelf positioned for assembly with four vertical members each of which has a full tapered plastic wedge attached thereto.

In FIG. 1 a molded plastic shelf is designated generally by reference numeral 10 and may be fabricated in one molding operation by any conventional plastic molding operation utilizing any suitable known plastic material. The shelf structure is molded with a grid structure of plastic or the like designated generally by reference numeral 12 and comprising in cross section shapes of a general T-formation shown in cross-sectional views FIGS. 7, 8, and 9. Such an arrangement reduces weight, simplifies grid construction and fabrication and provides ventilation and drainage if necessary.

Figure 3:
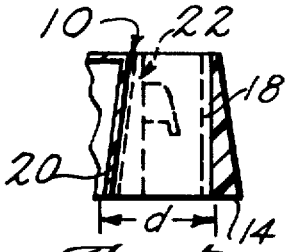
FIG. 3 is a cross-sectional view taken along lines 3—3 in FIG. 4.
Figure 4:
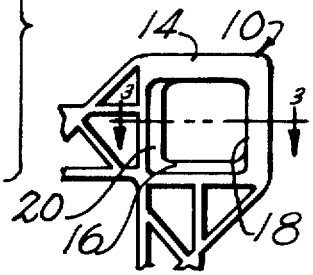
FIG. 4 is a bottom view of one of the corners of the shelf shown in FIG. 1 taken along lines 4—4 in FIG. 10.
Figure 2:
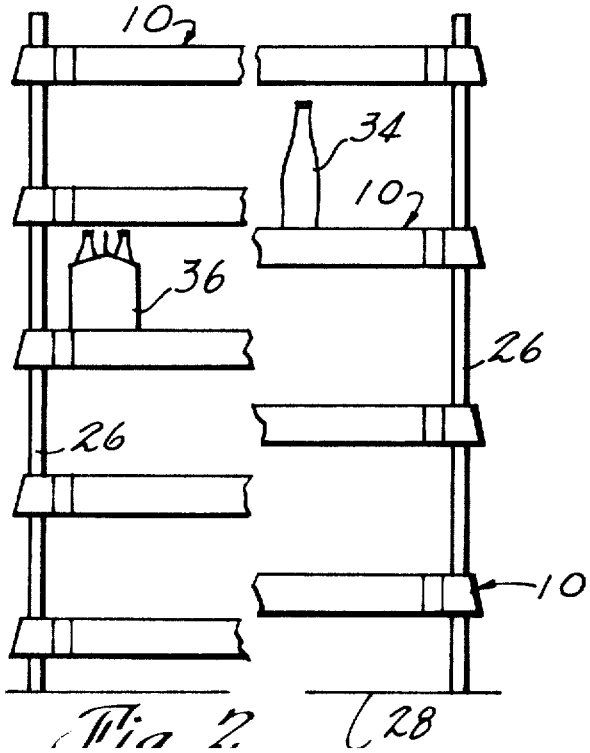
FIG. 2 is an elevation view of a shelf structure arrangement assembled with a plurality of shelves of the sort shown in FIG. 1 showing different arrangements.

Each shelf 10 is molded at a respective corner with identical shelf retaining means comprising a sleeve-like formation 14 which provides a cavity in the form of a bore 16 therethrough which is generally vertical on one side at 18 as shown in FIG. 3 and tapered on the other side at 20 as shown in FIG. 3 to receive a retaining or locking wedge support means designated generally by reference numeral 22 to be described later. It should be noted that what is provided is a cavity with a tapered face 20 on one side and a straight face 18 on the other side and it is shown in closed-sleeve formation but can be made partially complete. Each corner 14 is to be assembled with a respective vertical support member 26 which as seen in FIG. 2 rests on the floor 28 as in a supermarket. There may be a plurality of shelves 10 selectively arranged with any distance therebetween provided by means of adjustment which includes the wedge means 22 mentioned previously which is positionable selectively in one of a number of locations comprising small slots 30 spaced vertically along the members 26. This not only is a plurality of shelves 10 of lightweight construction, there are a number of locations for each shelf providing adjustment between shelves to accommodate bottles or other merchandise 34, cartons of soft drinks 36 or anything else which may be supported and displayed on the shelves 10.

Figure 5:
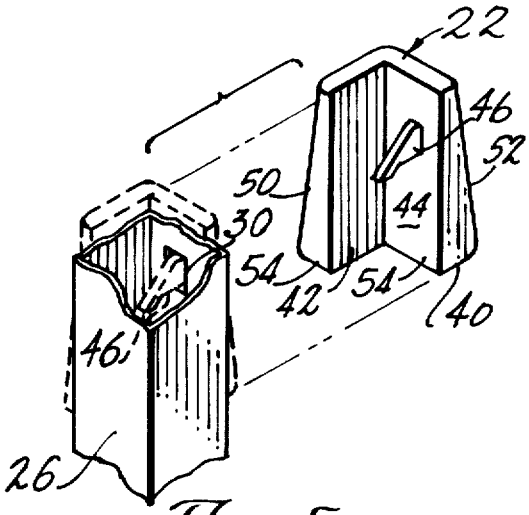
FIG. 5 is an enlarged assembly view of one of the plastic locking wedges and a portion of one of the vertical members.

With reference to various stages of the drawings particularly FIGS. 1, 3 and 5, the wedge means 22 comprises individually, molded plastic wedge members 40 each having straight faces 42, 44 perpendicular with each other on the inside of the plastic member 40 and a small tongue, tang or protrusion 46 which fits into a respective location in a slot 30. *Thus, each plug member 40 is of one-piece construction that is generally tubular in configuration but with a substantial gap defined by a side wall section cut away therefrom from the top edge to the bottom edge of the plug member, all as viewed in FIG. 5. This gap is sized to permit the one-piece plug member to be engaged with and disengaged from the hollow support member 26 in seated relation in response to movement thereof along a path transverse to the axis of the support member, compare solid line position of plug member 40 to phantom line position as shown in FIG. 5. Further, the protrusion 46 and slot 30 constitutes locater means partially carried respectively by the plug member 40 and partially carried by the hollow support member 26 for locating the plug member in the desired vertical position on the support member, that portion 46 carried by the plug member being of unitary construction therewith. However, the protrusion 46 and slot 30 also serve to connect the plug member 40 in seated relation with the support member 26 at the desired vertical position when the shelf 12 or planar framework is not engaged therewith as shown in FIG. 1 and in phantom lines in FIG. 5.* The outside of the plastic wedge member 40 is tapered on two faces 50, 52 being thicker at the bottom 54 than at the top 56 and positioned with the tongue 46 inserted into a slot 30 in a manner shown in FIG. 5. The distance *d* across the bottom opening as shown in FIG. 3 of the respective corner 14 is slightly larger than the distance across either side of the top of the wedge members 40 whereby each corner of the shelf 10 will fit down over the wedge but since the face 20 of the interior of the corner 14 tapers the interior distance narrows and cannot pass over the outside distance of the wedge 40 as the bottom portion 54 is approached. This can be accomplished by open arrangement in the corner 14 as well as a closed arrangement but a closed arrangement can be molded just as well and perhaps looks a little neater and performs possibly a little better.

While there is shown and described a particular embodiment of the invention together with suggested mode of operation thereof this is by way of illustration only since various alterations, changes, modifications, deviations, additions, removals, substitutions, integrations, eliminations and other departures may be made in the disclosed subject matter without departing from the scope of the invention as defined by proper interpretation of the appended claims.

What is claimed:

1. In a shelf support arrangement for merchandise wherein a plurality of identical shelves supported from the floor may be positioned at different levels.

a. vertical support members, arranged to define a quadrangle, b. at least one shelf having corners supported on said vertical members at each of the corners of said shelf, c. each of the corners of said shelf being formed with a recess therein comprising at least two angularly disposed faces corresponding with and complementary to angularly disposed faces on each respective vertical member, d. a plurality of openings spaced vertically on each of said support members and each opening representing a potential position for one corner of said shelf, e. a tapered plug member for each support member and shelf recess, each plug member having a protrusion on the interior thereof inserted in a respective opening on a support member and all of said plug members being so engaged with a corresponding corner vertical support member to locate said shelf at the same elevation supported at each respective corner and said shelf being wedged on said tapered plug members to retain said shelf substantially at the selected location and to prevent said shelf from becoming completely dislodged therefrom when merchandise is loaded thereon but permitting said shelf to be lifted from said plug members and said plug members being repositionable in different locations to receive said shelf repositioned thereon.

2. The device claimed in claim 1 wherein:

said tapered plug member has at least two angularly disposed faces corresponding with and placed against faces on said vertical support members.

3. The shelf support arrangement claimed in claim 1 wherein:

said shelf is formed with a sleeve-like formation at each corner with a bore therein through which said respective vertical support member passes.

4. The shelf support arrangement claimed in claim 2:

said shelf having a sleeve-like formation at each corner thereof with a bore therethrough into which is inserted said respective vertical support member which extends therefrom.

5. The device in claim 1:

said tapered plug member being molded in one piece and comprising two sections arranged at right angles to each other and being flat on the inside and tapered on the outside.

6. The device in claim 1 wherein:

said tapered plug member protrusion is a small finger fixed on one face and being offset to fit into a hole.

7. The device in claim 1:

said shelf being molded from plastic in one piece including corner sockets molded in one piece and a grid structure providing a shelf surface for merchandise thereon.

8. The device in claim 7:

said shelf structure being T-shaped in cross-section through certain grids thereof.

9. The device in claim 7:

said shelf being molded with the corners thereof outside the perimeter of the sides of the shelf grid.

10. The device in claim 4:

said vertical supports being a quadrangle in cross-section and the holes being in one side of said vertical support.

*11. A support structure for fixing a framework in position relative to ground level, said structure comprising:*

*at least one vertical support member,*

*a one-piece plug member seated on said support member, said one-piece plug member having a tapered outer face that tapers outward relative to said support member from the top edge to the bottom edge of said plug member, said one-piece plug member also being generally tubular in configuration but with a substantial gap defined by a side wall section cut away therefrom from the top edge to the bottom edge of said plug member, said gap being sized to permit said one-piece plug member to be engaged with and disengaged from said support member in seated relation in response to movement thereof along a path transverse to the axis of said support member,*

*locater means partially carried by said one-piece plug*

*member and partially carried by said vertical support member for locating said plug member in a desired vertical position on said support member, that portion of said locater means carried by said one-piece plug member being of unitary construction with said plug member, said locater means also serving to connect said one-piece plug member in seated relation with said support member at the desired vertical position thereon when said framework is not engaged therewith,*

*corner structure fixed to said framework at a selected position thereon, said corner structure being connected with said support member, said corner structure defining a tapered face corresponding with and complimentary to the tapered face on said one-piece plug member, and said corner structure's tapered face being seated against said one-piece plug member's tapered face,*

*said corner structure and said one-piece plug member cooperating to wedge said framework in place relative to said support member substantially at that desired vertical position where said plug member is seated on said support member and cooperating to prevent said framework from becoming dislodged downwardly therefrom when a load is positioned on top said framework, but permitting said framework to be easily lifted upwardly from said plug member if it is desired to disassemble said support structure.*

*12. A support structure as set forth in Claim 11, said vertical support member having a multi-sided cross-sectional configuration of at least three sides, and said plug member having at least two sides adapted to seat against two of said support member's three sides.*

*13. A support structure as set forth in Claim 11, said support member being of tubular configuration, and said locater means including structure defining a hole in said tubular support member and including a protrusion integral with said plug member, said protrusion being seated in said hole.*

*14. A support structure as set forth in Claim 11, said corner structure including a sleeve-like formation with a bore therethrough, said sleeve-like formatoin surrounding said support member and plug member to retain said support member and framework in assembly.*

References Cited

The following references, cited by the Examiner, are of record in the patented file of this patent or the original patent.

UNITED STATES PATENTS

| | | | |
|---|---|---|---|
| 3,424,111 | 1/1969 | Maslow | 108—144 |
| 1,418,435 | 6/1922 | Gardiner | 108—106 X |
| 3,682,323 | 8/1972 | Bergquist | 108—110 X |
| 3,523,508 | 8/1970 | Maslow | 108—144 |

JAMES C. MITCHELL, Primary Examiner

U.S. Cl. X.R.

108—107, 111, 151